R. E. BAKER.
FRYING PAN.
APPLICATION FILED DEC. 2, 1916.

1,264,475.

Patented Apr. 30, 1918.

Witness
Stuart Hilder.

Inventor,
Robert E. Baker.
E.W. Anderson &Son
His Attorneys
By

UNITED STATES PATENT OFFICE.

ROBERT E. BAKER, OF HOPEWELL, VIRGINIA.

FRYING-PAN.

1,264,475.  Specification of Letters Patent.  Patented Apr. 30, 1918.

Application filed December 2, 1916. Serial No. 134,705.

*To all whom it may concern:*

Be it known that I, ROBERT E. BAKER, a citizen of the United States, and a resident of Hopewell, in the county of Prince George and State of Virginia, have made a certain new and useful Invention in Frying-Pans; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
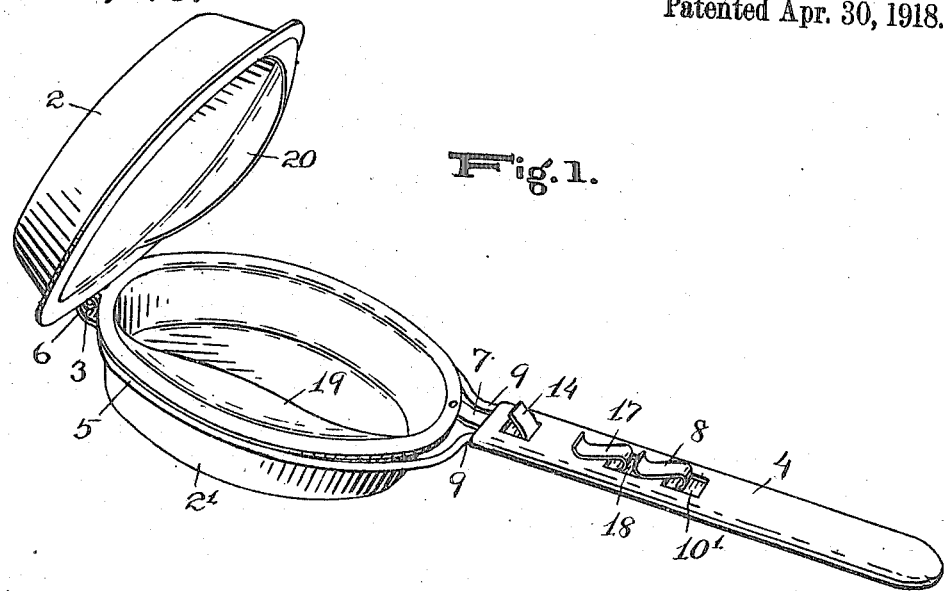
Figure 1 is a perspective view of the invention with the cover pan raised.
Figure 2:
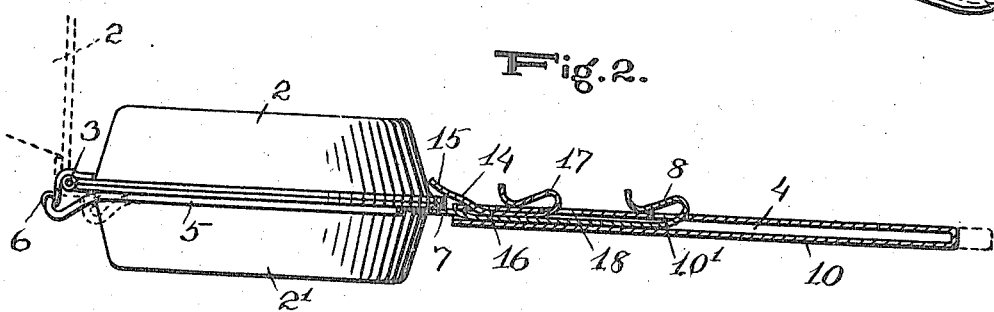
Fig. 2 is a side view partly in section, with the cover pan closed and latched.
Figure 3:
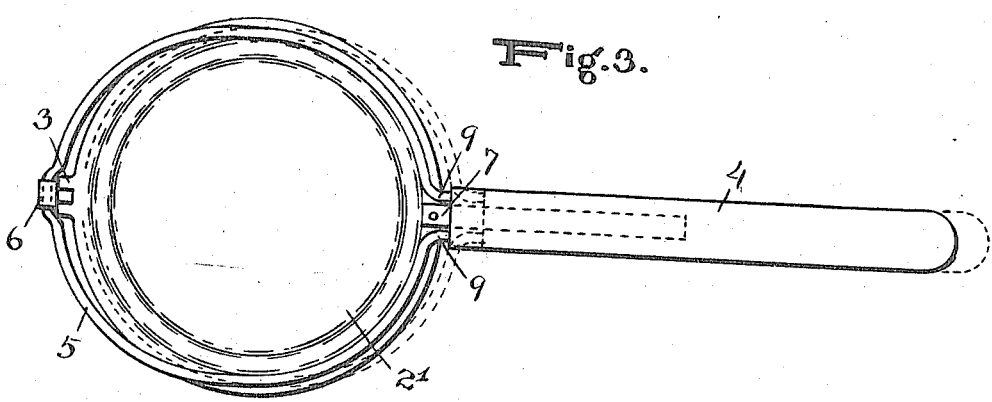
Fig. 3 is a bottom plan view of the invention.

The invention has relation to frying pans, and it consists in the novel construction and combinations of parts as hereinafter set forth.

In the accompanying drawings illustrating the invention, the numerals 2, 2', designate upper and lower duplicate pans, each similar to an ordinary frying pan, the two pans being hinged together in rear at 3.

4 is a handle for the pans, said handle being carried by a member or wire annulus 5, surrounding the lower of the pans, and at one end having engagement with a depending loop 6 of the upper pan, said loop forming a lever extension of the upper pan and having pivotal engagement with said annulus, whereby upon movement of the annulus in one direction with respect to the pans, the lever extension will be forced toward the lower pan and the upper pan will be raised upon the hinge 3 to expose the contents of the lower pan.

In order to so raise the upper pan, the lower pan is provided with a handle extension 7, sliding within guides of the handle proper, and provided with an upwardly projecting handle or operating end 8, finger pressure upon said end causing the pans to move as previously stated with relation to the handle and annulus, and raising the cover pan.

The handle is usually formed of two wire rods 9, said rods being extensions of the wire annulus, and a sheet metal cover 10, bent downwardly and inwardly around said rods, the handle extension of the lower pan fitting and sliding between said rods and below said cover.

The lower part of the cover 10 forms a rest for the handle extension in its sliding movement, said extension being bent upwardly and reversely to form the operating end 8 thereof, said end engaging a perforation 10' of the cover 10, and sliding upon the upper surface of said cover.

A latch 14 is provided to hold the upper pan in closed position, said latch usually consisting of a bar sliding between the handle extension 7 and the cover 10, and having an inner upwardly projecting end 15, engaging a perforation 16 of said cover and designed for engagement with the rim of the upper pan, and an upwardly and reversely bent outer operating end 17, engaging a perforation 18 of said cover and sliding upon the top thereof.

In order to avoid liability of liquids escaping from the pan in the reversal thereof, the lower pan is provided at one side of its side wall with an arcuate upwardly and inwardly curved lip 19 engaging within the side wall of the other pan, and the upper pan is provided at the other side thereof with a similar downwardly extending lip 20, engaging within the side wall of the lower pan, the two lips guarding the joint between the pans.

The pan is reversible for cooking in either of the two pan members, the contents being thereby readily shifted as required to prevent burning in the cooking operation. The handle is usually grasped with one hand, and thumb pressure of the same hand will readily raise the cover pan and operate the latch.

I claim:—

1. In a frying pan, upper and lower pans having in rear thereof a hinged connection, a forwardly extending handle including an element embracing the lower pan and in which said lower pan is adapted to move forwardly and rearwardly, the upper pan having in rear thereof a lever extension pivotally engaging the rear end of said element, and the lower pan having a handle extension slidable along said handle.

2. In a frying pan, upper and lower pans having in rear thereof a hinged connection, a forwardly extending handle including an element embracing the lower pan and in which said lower pan is adapted to move forwardly and rearwardly, the upper pan having in rear thereof a lever extension pivotally engaging the rear end of said element, and the lower pan having a handle extension slidable along said handle, and a latch for holding the upper pan in closed position and also having an operating device slidable along said handle.

3. In a frying pan, upper and lower pans having in rear thereof a hinged connection, a forwardly extending handle including an element embracing the lower pan and in which said lower pan is adapted to move forwardly and rearwardly, the upper pan having in rear thereof a lever extension pivotally engaging the rear end of said element, and the lower pan having a handle extension slidable along said handle, the lower pan having at one side an upwardly extending pouring lip extending within the side wall of the upper pan, and the upper pan having a downwardly extending pouring lip extending within the side wall of the lower pan.

4. In a frying pan, upper and lower duplicate pans, having in rear a hinged connection, a forwardly extending handle including an element embracing the lower pan and in which said lower pan is adapted to move forwardly and rearwardly, the upper pan having in rear a depending lever extension pivotally engaging the rear end of said element, and the lower pan having a handle extension slidable in guides of said handle.

In testimony whereof I affix my signature in presence of two witnesses.

ROBERT E. BAKER.

Witnesses:
 GEORGE M. ANDERSON,
 STUART HILDER.

Copies of this patent may be obtained for five cents each, by addressing the "Commissioner of Patents, Washington, D. C."